Patented June 7, 1949

2,472,417

UNITED STATES PATENT OFFICE 2,472,417

PROCESS OF MANUFACTURE OF GLYCOL

Max Gonze, Forest-Brussels, Belgium, assignor to Solvay & Cie, Brussels, Belgium, a company of Belgium No Drawing. Application July 23, 1947, Serial No. 763,140. In Switzerland October 15, 1942

Section 1, Public Law 690, August 8, 1946
Patent expires December 24, 1962

4 Claims. (Cl. 260—635)

It is known that glycol can be manufactured by the action of water on ethylene oxide according to the reaction:

$$C_2H_4O + H_2O = C_2H_4(OH)_2$$

This hydration is accelerated in the presence of acid.

Up to the present the acidity has been obtained by the use of acids which can be eliminated from the aqueous solution by precipitation in the form of insoluble salts, such as: sulphuric acid and oxalic acid whose precipitation can be ensured by neutralisation by means of alkaline earth bases. In practice, however, separation of the precipitate and the solution is long and difficult, and this process causes scaling in the evaporating apparatus. There has also been suggested, as acid catalyst, perchloric acid whose potassium salt is little soluble in water but dissolves completely in glycol; this salt separates in the course of evaporation and distillation of the glycol and also causes sealing of the apparatus.

The invention has for its object to overcome these difficulties; it is based on the property not yet utilised for this purpose, of certain organic acids being decomposed, under the action of a moderate heat, into volatile products which are eliminated without difficulty. The presence of solid substances in the processing liquids is thus avoided.

According to the invention, hydration of ethylene oxide is effected in the presence of a trihalogenacetic acid, which has the advantage of being decomposable into volatile products at a temperature above the temperature of hydration of ethylene oxide. In practice an acid which is particularly suitable for this purpose is trichloracetic acid which commences to decompose towards 60° C. At this temperature the speed of hydration of ethylene oxide is much greater than the speed of decomposition of trichloracetic acid. An additional advantage consists in the production of chloroform as decomposition product of the trichloracetic acid.

The process, according to the invention, comprises the following operations:

Ethylene oxide is brought into contact with a dilute aqueous solution of trichloracetic acid at a temperature of the order of 60° C. There is produced glycol and small quantities of polyethylene glycols. The mixture of these bodies with the excess of water and trichloracetic acid is submitted to evaporation at 100° C. At this temperature the trichloracetic acid is decomposed into chloroform and carbon dioxide which are liberated at the same time as the water vapor. This mixture of gas and vapors is led into a condenser where the $CO_2$ is separated, the condensate running into a florentine flask where the water is separated from the chloroform by difference of density.

The liquid mixture coming from the evaporator comprises glycol, a little di- or polyethylene glycol and water. It contains also traces of hydrochloric acid which is produced in the evaporator. This mixture is brought into contact with lime to neutralise acidity and then subjected to distillation. The vapors are condensed and produce pure glycol, whilst the residual liquor contains polyethylene glycols and small quantities of calcium chloride coming from the neutralisation of the hydrochloric acid. If desired, this liquid can be re-distilled to separate it into its constituents.

The chloroform recovered can be used as medicinal chloroform.

The process is illustrated by the practical data cited below by way of example.

In a scrubber, maintained at 60° C., there is caused to circulate in counter current, 723 gms. of ethylene oxide and 2845 gms. of a solution containing 14.6 gms. of trichloracetic acid.

The solution leaving the scrubber is maintained at 60° C., in a suitable container, for a time sufficient to complete hydration of the ethylene oxide. The solution thus formed, containing 2558 gms. of water, 850 gms. of glycol, 140 gms. of diethylene glycol, 10 gms. of triethylene glycol and 14.6 gms. of trichloracetic acid, is maintained at 100° C. There are liberated 3.9 gms. of carbon dioxide, 10.5 gms. of chloroform and a certain quantity of water vapor. At the same time there are formed traces of hydrochloric acid, which is neutralised by calcium carbonate.

The solution is then evaporated in order to separate the water, and the mixture of glycols remaining is subjected to distillation. There is thus obtained 850 gms. of monoethylene glycol, and there remains as residue, 140 gms. of diethylene glycol, 10 gms. triethylene glycol and 0.15 gms. of calcium chloride.

I claim:

1. In a process of producing ethylenic glycol, the step consisting in hydrating ethylene oxide in the presence of a trihalogenacetic acid thereby producing glycol and volatile products, and separating the glycol from said volatile products by the action of heat.

2. In a process of producing ethylenic glycol, the step consisting in hydrating ethylene oxide in the presence of trichloracetic acid.

3. In a process of producing ethylenic glycol, causing ethylene oxide to react with water in presence of a small quantity of trichloracetic acid at a temperature of about 60° C., heating the resulting products to about 100° to separate the volatile product from the glycol produced, and recovering the glycol.

4. In a process of producing ethylenic glycol, hydrating ethylene oxide with a dilute aqueous solution of trichloracetic acid at a temperature of about 60° C., heating the mixture of products of the reaction and trichloracetic acid to about 100° C. thereby freeing carbon dioxide, water vapor and chloroform, neutralizing the remaining liquid containing glycol, some polyethylene glycol and water, subjecting said liquid to distillation and condensing the vapor produced.

MAX GONZE.

REFERENCES CITED

The following references are of record in the file of this patent:

UNITED STATES PATENTS

| Number    | Name          | Date          |
|-----------|---------------|---------------|
| 1,875,312 | Youtz         | Aug. 30, 1932 |
| 2,108,936 | Ferrero et al.| Feb. 22, 1938 |
| 2,135,271 | Balcar I      | Nov. 1, 1938  |
| 2,325,576 | Balcar II     | July 27, 1943 |
| 2,421,862 | Arundale et al.| June 10, 1947 |